United States Patent [19]

Hahn et al.

[11] Patent Number: 5,262,445
[45] Date of Patent: Nov. 16, 1993

[54] HEAT DISTORTION RESISTANT, EXPANDABLE STYRENE POLYMERS HAVING A HIGH CAPACITY FOR EXPANSION

[75] Inventors: Klaus Hahn, Kirchheim; Uwe Guhr, Gruenstadt; Hans Hintz, Ludwigshafen; Dietmar Wittenberg, Mannheim, all of Fed. Rep. of Germany

[73] Assignee: BASF Aktiengesellschaft, Ludwigshafen, Fed. Rep. of Germany

[21] Appl. No.: 913,374

[22] Filed: Jul. 15, 1992

Related U.S. Application Data

[60] Division of Ser. No. 789,454, Nov. 7, 1991, Pat. No. 5,173,514, which is a continuation of Ser. No. 585,901, Sep. 21, 1990, abandoned.

[30] Foreign Application Priority Data

Sep. 23, 1989 [DE] Fed. Rep. of Germany ....... 3931862

[51] Int. Cl.$^5$ ............................................. C08J 9/16
[52] U.S. Cl. ....................... 521/59; 521/60; 521/139
[58] Field of Search ............................ 521/59, 60, 139

[56] References Cited

U.S. PATENT DOCUMENTS

| | | | |
|---|---|---|---|
| 4,191,803 | 3/1980 | Katoh | 521/58 |
| 4,207,402 | 6/1980 | Sprenkle, Jr. | 521/139 |
| 4,661,302 | 4/1987 | Park | 521/98 |
| 4,705,811 | 11/1987 | Park | 521/98 |
| 4,727,093 | 2/1988 | Allen et al. | 521/81 |
| 4,734,441 | 3/1988 | Park | 521/88 |
| 4,857,390 | 8/1989 | Allen et al. | 521/139 |
| 4,927,858 | 5/1990 | Joyce et al. | 521/56 |
| 4,927,859 | 5/1990 | Weber et al. | 521/59 |

FOREIGN PATENT DOCUMENTS

| | | |
|---|---|---|
| 0241258 | 10/1987 | European Pat. Off. |
| 0294783 | 12/1988 | European Pat. Off. |
| 0383133 | 8/1990 | European Pat. Off. |
| 0410302 | 1/1991 | European Pat. Off. |
| 3234660 | 3/1984 | Fed. Rep. of Germany |

Primary Examiner—John Kight, III
Assistant Examiner—T. Mosley
Attorney, Agent, or Firm—Oblon, Spivak, McClelland, Maier & Neustadt

[57] ABSTRACT

Expandable styrene polymers containing
a) from 80 to 99% by weight of polystyrene,
b) from 1 to 20% by weight of a styrene-soluble polymer having a softening point above 140° C.,
c) from 3 to 10% by weight, based on the sum of a) and b), of a $C_3$- to $C_6$-hydrocarbon as blowing agent, and, if desired, d) conventional additives, the mixture of components a) and b) having a melt flow index MFI 200/5 of from 15 to 30, have high heat distortion resistance and a high capacity for expansion.

4 Claims, No Drawings

HEAT DISTORTION RESISTANT, EXPANDABLE STYRENE POLYMERS HAVING A HIGH CAPACITY FOR EXPANSION

This is a division of application Ser. No. 07/789,454, filed on Nov. 7, 1991 now U.S. Pat. No. 5,173,514, which is a Continuation Application of Ser. No. 07/585,901 filed on Sep. 21, 1990, now abandoned.

Foams based on a mixture of polystyrene and a polymer having a high softening point have substantially higher heat distortion resistance than polystyrene foams. However, products of this type have not attained any degree of industrial importance hitherto since economic processes for the preparation of corresponding expandable styrene polymers required for the production of foam moldings were unknown and, in addition, the products had unsatisfactory capacity for expansion.

It is an object of the present invention to develop expandable styrene polymers which are suitable for the production of heat distortion resistant foams and which have a high capacity for expansion.

We have found that, surprisingly, this object is achieved by blowing agent-containing mixtures of polystyrene and a styrene-soluble polymer having a high softening point, if the blowing agent-free mixture of the polymers has a melt flow index MFI 200/5 of from 15 to 20. Mixtures of this type can be obtained in a simple manner by the suspension polymerization of a solution of the polymer having a high softening point in styrene in the presence of a regulator.

The present invention accordingly provides expandable styrene polymers containing
a) from 80 to 99% of polystyrene,
b) from 1 to 20% by weight of a styrene-soluble polymer having a softening point above 140° C.,
c) from 3 to 10% by weight, based on the sum of a) and b), of a $C_3$- to $C_6$-hydrocarbon as blowing agent, and, if desired,
d) conventional additives in effective amounts,
the mixture of components a) and b) having a melt flow index MFI 200/5 of from 15 to 30.

The present invention furthermore provides a process for the preparation of expandable styrene polymers of this type, which comprises dissolving component b) in styrene, polymerizing the solution in aqueous suspension in the presence of from 0.01 to 3% by weight, based on styrene, of a conventional regulator having a chain-transfer constant K of from 0.1 to 50, and adding the blowing agent and, if used, the additives before, during or after the polymerization.

The present invention also provides foams having a density of from 0.005 to 0.1 g/cm$^3$ and containing
a) from 80 to 99% by weight of polystyrene and
b) from 1 to 20% by weight of a styrene-soluble polymer having a softening point above 140° C.,
and, if desired, conventional additives in effective amounts, the mixture of components a) and b) having a melt flow index MFI 200/5 of from 15 to 30.

Surprisingly, the foams produced from the novel expandable styrene polymers have high dimensional stability even at elevated temperature.

The novel products contain, as the principal component a), from 80 to 99% by weight, preferably from 75 to 98% by weight, in particular from 90 to 97% by weight, of polystrene.

The novel products furthermore contain, as component b), from 1 to 20% by weight, preferably from 2 to 15% by weight, in particular from 3 to 10% by weight, of a styrene-soluble polymer having a softening point above 140° C., preferably from 150° to 210° C., in particular from 160° to 200° C.

It is preferred that these polymers have sufficient solubility in styrene for the amount of component b) required for the preparation of the novel products to be soluble in the corresponding amount of styrene. Examples of suitable polymers are poly-1,4-phenylene sulfide (softening point 190° C.), poly-(2,6-dimethyl)-1,4-phenylene ether (softening point 200° C.) and styrene-maleic acid (anhydride) copolymers containing from 10 to 49% by weight of maleic acid or maleic anhydride (softening point 150° to 170° C.).

It is essential to the invention that the blowing agent-free mixture of components a) and b) has a melt flow index MFI 200/5 (in accordance with DIN 53 735) of from 15 to 30, in particular from 17 to 28. If the MFI is below 15, the expansion capacity is unsatisfactory; a value above 30 means that the dimensional stability of the foams produced therefrom is inadequate.

The expandable styrene polymers contain, as blowing agent, from 3 to 10% by weight, preferably from 4 to 9% by weight, in particular from 5 to 8% by weight, based on the sum of a) and b), of a $C_3$- to $C_6$-hydrocarbon, such as propane, butane, isobutane, n-pentane, i-pentane, neopentane and/or hexane. Preference is given to a commercially available pentane mixture.

The polystyrene particles may also contain other substances which provide the expandable product with certain properties. Examples which may be mentioned are flameproofing agents based on organic bromine or chlorine compounds, such as trisdibromopropyl phosphate, hexabromocyclododecane or chlorinated paraffin, and synergists for flameproofing agents, such as dicumyl peroxide and highly labile organic peroxides; furthermore antistatics, stabilizers, dyes, lubricants, fillers and substances which have an antiadhesive effect on prefoaming, such as zinc stearate, melamine-formaldehyde condensates or silica, and agents for reducing the demolding time on expansion, for example glycerol esters of hydroxycarboxylates. The additives may be homogeneously distributed in the particles or in the form of a surface coating, depending on the intended action.

Other suitable additives are styrene-soluble styrene-acrylonitrile copolymers, which, in small amounts, prevent shrinkage of the foams. If the amount added is increased, the foams have high oil resistance.

The expandable styrene polymers have a high expansion capacity E of from 30 to 80, preferably from 40 to 80, in particular from 50 to 80, E being the ratio between the bulk density of the expandable beads to the bulk density of the foam beads obtained by steam treatment (6 minutes at 120° C.).

The expandable styrene polymers also have a ratio between the expansion capacity E and the amount of blowing agent M (=moles of blowing agent per kg of styrene polymer) of from 30 to 80, preferably from 40 to 80, in particular from 50 to 75. The novel products thus contribute to environmental protection, since significantly smaller amounts of blowing agent than in the prior art required to achieve the same density.

In a preferred process, the blowing agent-containing styrene polymers according to the invention are prepared by polymerizing a solution of component b) in styrene in aqueous suspension, the above-described blowing agents and, if used, the additives being added before, during or after the polymerization. It is also possible to dissolve mixtures of component b) with polystyrene, as is sometimes the usual commercial form, in styrene. During the polymerization, advantageously at a styrene conversion of from 20 to 90%, from 0.01 to 3% by weight, preferably from 00.5 to 2% by weight, in particular from 0.1 to 1% by weight, of a conventional, preferable bromine-free regulator having a chain-transfer constant K of from 0.1 to 50 are added.

The suspension polymerization of styrene is known per se and is described in detail in Kunststoff-Handbuch, Volume V (Polystyrol), Carl Hanser-Verlag, pages 679 to 688. In this process, styrene is suspended in water and conventional organic or inorganic suspension stabilizers are added, preferably in an amount of from 0.05 to 2% by weight, based on the suspension. The polymerization is generally carried out at from 80° to 130° C., preferably from 100° to 120° C., and is initiated by organic polymerization initiators, for example peroxides or azo compounds, which decompose to form free radicals on exposure to heat. They are employed in an amount of from 0.01 to 1% by weight, based on the monomers. The chain transfer agents are generally added to the polymerization batch at a conversion of from 20 to 90%, preferably from 40 to 60%. For the purposes of the present invention, conversion is taken to mean the percentage of polymerized monomers, based on the total amount of monomers employed. It can be measured, for example, by terminating the polymerization after a certain time, for example by adding inhibitors, and determining the amount of unpolymerized monomers.

The chain transfer agents used have a transfer constant K (measured by the method of Vollmert, Grundriβ der Makromolekularen Chemie, Springer Verlag, 1962, pages 52 and 71) of from 0.1 to 50, preferably from 1 to 30, for example:

| n-dodecyl mercaptan | (K = 19) |
|---|---|
| tert.-dodecyl mercaptan | (K = 3) |
| n-butyl mercaptan | (K = 22) |
| tert.-butyl mercaptan | (K = 3.6) |
| pentaphenylethane | (K = 2.0) |
| dimeric α-methylstyrene | (K = 0.5) |

The styrene content in the expandable styrene polymers should generally be low and should usually be less than 0.2% by weight, preferably less than 0.1% by weight, in particular less than 0.08% by weight. In order to achieve this aim, it is expedient, when mercaptans are used as the regulator, to delay adding them until during the polymerization at a conversion of from 20 to 90%.

The blowing agent-containing styrene polymer particles according to the invention are in the form of beads and generally have a diameter of from 0.2 to 4 mm. They can be prefoamed by conventional methods, for example using steam at above the softening point, to give foam particles having a diameter of from 0.5 to 2 cm and a density of from 0.005 to 0.1 g/cm³. It has been shown that this considerably increases the throughput through the added chain transfer agents.

The prefoamed particles can then be expanded by conventional methods, i.e. by heating in molds which do not close in a gas-tight manner, to give foam moldings having a density of from 0.005 to 0.1 g/cm³.

The addition of chain transfer agents affects the molecular weight and the molecular weight distribution of the resultant polymers, and thus also their rheological properties, which are in turn responsible for the capacity for expansion of the blowing agent-containing polystyrene particles and the dimensional stability of foam moldings produced therefrom. Thus, for example, a reduction in the melt extensibility results in a better expansion capacity, and a reduction in the reversible elongation at the same melt extensibility results in improved dimensional stability. Both properties can be measured directly on the blowing agent-containing styrene polymer particles by a procedure in Prüfung hochpolymerer Werkstoffe, Carl Hanser Verlag, Vienna, 1977, pages 422. The products according to the invention generally have, measured by the method described, a melt expansibility of less than $4.2 \cdot 10^6$ [Pas], preferably from 1.5 to $3.0 \cdot 10^6$ [Pas], and a reversible elongation of less than 0.95, preferably from 0.6 to 0.9.

The novel foams have high heat distortion resistance, and are generally dimensionally stable even at above 100° C., in some cases even up to 120° C.

In the examples, parts are by weight.

EXAMPLES 1 TO 29

1. Polymerization

A mixture of 200 parts of water, 0.1 part of sodium pyrophosphate, 0.15 part of tert.-butyl perbenzoate, 0.45 part of benzoyl peroxide, 100 parts of a styrene solution containing the amounts given in the table of styrene, polystyrene, polymer b) and, as regulator, divinylbenzene, 7 parts of pentane and 3 parts of a 10% strength aqueous solution of polyvinylpyrrolidone was heated to 90° C. with stirring in a pressure-tight stirred reactor, kept at 90° C. for 5 hours, and subsequently heated at 100° C. for 2 hours and at 120° C. for a further 2 hours. The regulator used was tert.-dodecyl mercaptan. The components were added in the amounts given in the table, based on the styrene solution, and at the point in time given in the table.

After cooling, the bead polymer obtained, having a mean bead diameter of 0.8 mm, was separated from the aqueous phase, washed and dried.

2. Product properties a) Melt flow index

The melt flow index MFI 200/5 was determined by the procedure of DIN 53 735 on a degassed sample freed from blowing agent.

b) Molecular weight measurement

The mean molecular weights $M_w$ (weight average) and the molecular weight distribution were determined by the GPC method using polystyrene as the standard. A column combination was assembled ensuring best-possible resolution both in the low-molecular-weight and high-molecular-weight ranges.

The column combination comprises 5 silica columns as follows, each with a length of L=300 mm and an internal diameter D=10 mm:

| 1 × Si | 60 |
|---|---|
| 1 × Si | 100 |
| 1 × Si | 300 |
| 1 × Si | 1000. |

The packing comprises LiChrospher and LiChrosorb from Merck (silica gels) having a grain size of 10 μm (with the exception of Si 60=LiChrosorb).

The flow rate is 2.8 ml/min, and the solvent is tetrahydrofuran. 200 μl of a 0.5% strength solution were injected at room temperature. The detector installed is a differential refractometer from Knauer, dual detector type 61.00. A drop counter is used to ensure a uniform flow rate.

In order to convert the measurements obtained to the molecular weight, a calibration curve is produced in parallel from 12 narrowly distributed polystyrene samples from Pressure Chemical Co. having known molecular weights.

In order to standardize the column combination used, the broad polystyrene sample No. 706 characterized by the National Bureau of Standards is measured, giving the following means for its molecular weight:
$M = 74,000$
$M_w = 243,000$
$M_n = 392,000$ The products according to the invention generally have a mean molecular weight $M_w$ of greater than $60 \cdot 10^3$ and less than $180 \cdot 10^3$, preferably from $100 \cdot 10^3$ to $180 \cdot 10^3$, in particular from $120 \cdot 10^3$ to $175 \cdot 10^3$. The gradient of the high-molecular-weight edge of the molecular weight distribution curve is characterized by the difference between the means $M_{n+1} - M_n$, as described by H. G. Elias in Makromoleküle, Hüttig Verlag, 1971, pages 52 and 64. In the case of the products according to the invention, the value for $M_{n+1} - M_n$ is generally less than $160 \cdot 10^3$, preferably less than $150 \cdot 10^3$, in particular less than $130 \cdot 10^3$.

c) Bulk density

As a measure of the capacity for expansion (6 minutes at 120° C.), the bulk density was measured using a sieve (mesh width: 0.1=0.2 mm) measuring 1000×800×250 mm with a metal frame in a sealed metal housing with steam inlet and extractor.

The steam at 120° C. passed into the prefoaming apparatus from below, passed through the wire fabric containing the products to be tested and escaped again through the steam extractor. Before commencing the tests, the apparatus was first preheated for about 5 minutes. 100 g of the expandable bead polymers were subsequently distributed uniformly on the wire fabric, the apparatus was sealed and the steam valve was opened. After 6 minutes, the steam valve was closed again and the metal housing was opened. The bulk density was subsequently determined on the prefoamed material.

d) Throughput during prefoaming

The bead polymers coated with 0.4 part by weight of glycerol monostearate were prefoamed to a bulk density of 15 g/l in a continuous stirred prefoamer, Rauscher type, using flowing steam, and the throughput was determined.

e) Heat distortion resistance

After interim storage for 24 hours, the prefoamed foam particles were welded in a block mold, Rauscher type, by steam treatment at a pressure of 1.8 bar to give a block with a density of 15 g/l.

The heat distortion resistance was determined on samples of the foam block in accordance with DIN 53 424 (Bestimmung der Formbeständigkeit in der Wärme bei Biegebeanspruchung and bie Druckbeanspruchung).

The results are shown in the table.

TABLE

| | Example | | | | | | | | | | | | | | | |
|---|---|---|---|---|---|---|---|---|---|---|---|---|---|---|---|---|
| | 1 (comp.) | 2 (comp.) | 3 | 4 | 5 | 6 | 7 | 8 | 9 | 10 | 11 | 12 | 13 | 14 | 15 | 16 |
| Styrene [% by wt.] | 90 | 90 | 95 | 95 | 95 | 90 | 90 | 90 | 95 | 95 | 95 | 95 | 90 | 90 | 90 | 90 |
| Polystyrene [% by wt.] | 2 | 2 | 1 | 1 | 1 | 2 | 2 | 2 | 1 | 1 | 1 | 1 | 2 | 2 | 2 | 2 |
| Polymer b* [% by wt.] | 8A | 8A | 4A | 4A | 4A | 8A | 8A | 8A | 4A | 4AS | 4A | 4A | 8A | 8A | 8A | 8A |
| Divinylbenzene [% by wt.] | — | 0.01 | — | 0.01 | 0.01 | — | 0.01 | 0.01 | — | 0.01 | — | 0.01 | — | 0.01 | — | 0.01 |
| tert-Dodecyl mercaptan [% by wt.] | — | — | 0.03 | 0.03 | 0.1 | 0.5 | 0.5 | 0.8 | 0.1 | 0.1 | 0.2 | 0.2 | 0.5 | 0.5 | 0.8 | 0.8 |
| Point of addition [% convers.] | — | — | 40 | 40 | 40 | 40 | 40 | 40 | 40 | 0 | 0 | 0 | 0 | 0 | 0 | 0 |
| MFI 200/5 [g/10 min] | 10 | 9 | 20 | 18 | 22 | 24 | 23 | 26 | 19 | 18 | 20 | 19 | 23 | 22 | 24 | 23 |
| $M_w \cdot 10^3$ | 191 | 190 | 168 | 174 | 157 | 141 | 147 | 128 | 171 | 174 | 161 | 163 | 144 | 149 | 138 | 141 |
| $M_{n+1} - M_n \cdot 10^3$ | 173 | 176 | 141 | 147 | 122 | 114 | 119 | 103 | 142 | 149 | 128 | 132 | 111 | 120 | 108 | 110 |
| Bulk density [g/l] | 35.4 | 36.1 | 23.4 | 24.3 | 19.2 | 14.9 | 15.2 | 13.9 | 23.8 | 24.1 | 19.5 | 19.0 | 14.9 | 14.9 | 14.0 | 141 |
| Throughput [kg.h] | 51 | 48 | 81 | 80 | 92 | 99 | 97 | 110 | 85 | 82 | 95 | 91 | 98 | 96 | 108 | 105 |
| Heat distortion resistance [°C.] | 115 | 120 | 107 | 110 | 109 | 114 | 119 | 118 | 107 | 110 | 106 | 110 | 113 | 115 | 113 | 116 |

| | Example | | | | | | | | | | | | |
|---|---|---|---|---|---|---|---|---|---|---|---|---|---|
| | 17 | 18 (comp.) | 19 (comp.) | 20 | 21 | 22 | 23 | 24 | 25 | 26 | 27 | 28 | 29 |
| Styrene [% by wt.] | 90 | 94 | 94 | 94 | 94 | 90 | 90 | 90 | 90 | 90 | 90 | 90 | 90 |
| Polystyrene [% by wt.] | 2 | 1.2 | 1.2 | 1.2 | 1.2 | 2 | 2 | 2 | 2 | 2 | — | — | — |
| Polymer b* [% by wt.] | 8A | 4.8B | 4.8B | 4.8B | 4.8B | 8B | 8B | 8B | 8B | 8B | 10C | 10C | 10C |
| Divinylbenzene [% by wt.] | — | — | 0.01 | — | 0.01 | — | 0.01 | — | 0.01 | 0.01 | — | 0.01 | 0.01 |
| tert-Dodecyl | 1.0 | — | — | 0.1 | 0.1 | 0.1 | 0.1 | 0.5 | 0.5 | 0.8 | — | — | 0.3 |

TABLE-continued

| | | | | | | | | | | | | | |
|---|---|---|---|---|---|---|---|---|---|---|---|---|---|
| mercaptan [% by wt.] Point of addition [% convers.] | 0 | — | — | 40 | 40 | 40 | 40 | 40 | 40 | 40 | — | — | 40 |
| MFI 200/5 [g/10 min] | 27 | 14 | 13 | 20 | 19 | 18 | 17 | 25 | 24 | 27 | 9 | 8 | 19 |
| $M_w \cdot 10^3$ | 124 | 210 | 220 | 161 | 166 | 180 | 172 | 139 | 144 | 121 | 198 | 194 | 135 |
| $M_{n+1} - M_n \cdot 10^3$ | 101 | 163 | 169 | 142 | 146 | 149 | 151 | 111 | 109 | 101 | 169 | 171 | 111 |
| Bulk density [g/l] | 13.7 | 29.9 | 30.8 | 24.0 | 24.5 | 25.9 | 26.2 | 14.3 | 14.5 | 13.4 | 29.9 | 30.5 | 15.8 |
| Throughput [kg.h] | 112 | 63 | 61 | 90 | 88 | 89 | 85 | 101 | 98 | 112 | 65 | 61 | 95 |
| Heat distortion resistance [°C.] | 112 | 112 | 114 | 111 | 114 | 116 | 118 | 115 | 118 | 115 | 112 | 114 | 113 |

*A = poly(2,6-dimethyl)-1,4-phenylene ether
B = poly-1,4-phenylene sulfide
C = styrene-maleic anhydride copolymer containing 15% by weight of maleic anhydride

We claim:

1. A foam having a density of from 0.005 to 0.1 g/cm³ comprising:
   a) from 80 to 99% by weight of polystyrene; and
   b) from 1 to 20% by weight of a styrene-soluble polymer having a softening point above 140° C., said styrene-soluble polymer being selected form the group consisting of poly-1,4-phenylene sulfide and a styrene-maleic acid (anhydride) copolymer containing from 10 to 49% by weight of maleic acid (anhydride),
   wherein the mixture of components a) and b) have a melt flow index MFI 200/5 of from 15 to 30.

2. The foam of claim 1, further comprising conventional additives in effective amounts to achieve their known function.

3. A process for the preparation of a foam having a density of from 0.005 to 0.1 g/cm³ comprising expanding an expandable polystyrene polymer in particle form by heating to above the softening point, and welding the resultant foam particles to one another by heating in a mold which does not close in a gas-tight manner,
   wherein said expandable styrene polymer comprises
   a) from 80 to 99% by weight of polystyrene;
   b) from 1 to 20% by weight of a styrene-soluble polymer having a softening point above 140° C., said styrene-soluble polymer being selected form the group consisting of poly-1,4-phenylene sulfide and a styrene-maleic acid (anhydride) copolymer containing from 10 to 49% by weight of maleic acid (anhydride); and
   c) from 3 to 10% by weight, based on the sum of a) and b) of a $C_3$- to $C_6$-hydrocarbon as blowing agent;
   wherein the mixture of components a) and b) have a melt flow index MFI 200/5 of from 15 to 30.

4. The process of claim 3, wherein said expandable polystyrene polymer further comprises conventional additives in effective amounts to achieve their known function.

* * * * *